United States Patent
Phillips et al.

(10) Patent No.: US 9,367,057 B2
(45) Date of Patent: Jun. 14, 2016

(54) SYSTEM AND METHOD FOR REAL-TIME CONTROLS OF ENERGY CONSUMING DEVICES INCLUDING TIERED ARCHITECTURE

(75) Inventors: Stephen Louis Phillips, Gainesville, GA (US); Michael Bradley Martin, Edmond, OK (US); Andrew Manzo, Redwood City, CA (US)

(73) Assignee: Omniboard, Inc., South San Francisco, CA (US)

(*) Notice: Subject to any disclaimer, the term of this patent is extended or adjusted under 35 U.S.C. 154(b) by 1004 days.

(21) Appl. No.: 13/401,745

(22) Filed: Feb. 21, 2012

(65) Prior Publication Data

US 2013/0218350 A1    Aug. 22, 2013

(51) Int. Cl.
*G05B 15/02* (2006.01)

(52) U.S. Cl.
CPC ........ *G05B 15/02* (2013.01); *G05B 2219/2642* (2013.01)

(58) Field of Classification Search
CPC .............. G06Q 10/00; G06Q 10/0631; G06Q 10/06312; H02J 2003/143; Y02B 70/3225; Y02B 70/3266; Y02B 70/3241; Y04S 10/54; Y04S 20/227; G05B 2219/2642; G05B 19/0421; G05B 2219/2614; G06F 1/3206
USPC .......................... 700/2, 17, 32, 286, 291, 297
See application file for complete search history.

(56) References Cited

U.S. PATENT DOCUMENTS

| | | | |
|---|---|---|---|
| 7,565,351 B1 | 7/2009 | Callaghan | |
| 8,176,095 B2 | 5/2012 | Murray et al. | |
| 8,239,073 B2 | 8/2012 | Fausak et al. | |
| 8,375,068 B1 | 2/2013 | Platt et al. | |
| 9,170,579 B1 | 10/2015 | Witter et al. | |
| 2007/0061018 A1 | 3/2007 | Callaghan et al. | |
| 2009/0043415 A1* | 2/2009 | Sun | G05B 19/4183 700/117 |
| 2009/0065596 A1* | 3/2009 | Seem | F24F 11/0009 236/51 |
| 2009/0157529 A1* | 6/2009 | Ehlers et al. | 705/26 |
| 2009/0240380 A1* | 9/2009 | Shah et al. | 700/295 |
| 2010/0106306 A1* | 4/2010 | Simon | H05B 33/0854 700/276 |
| 2010/0274366 A1* | 10/2010 | Fata et al. | 700/7 |
| 2010/0324962 A1* | 12/2010 | Nesler et al. | 705/8 |
| 2011/0071685 A1* | 3/2011 | Huneycutt | G05B 15/02 700/275 |
| 2011/0082596 A1* | 4/2011 | Meagher et al. | 700/291 |
| 2011/0173109 A1* | 7/2011 | Synesiou et al. | 705/34 |
| 2011/0190952 A1* | 8/2011 | Goldstein | 700/291 |
| 2012/0004785 A1* | 1/2012 | Son et al. | 700/295 |
| 2012/0185104 A1* | 7/2012 | Unver et al. | 700/291 |
| 2012/0296451 A1* | 11/2012 | Kaps et al. | 700/83 |

(Continued)

*Primary Examiner* — Darrin Dunn
(74) *Attorney, Agent, or Firm* — Carr & Ferrell LLP

(57) ABSTRACT

A system for operating a plurality of energy consuming devices is provided that includes a plurality of device drivers coupled to respective device controllers. Each device controller is associated with a corresponding one of the energy consuming devices, and each device controller includes at least one sensor and is adapted to modulate an output setting of the corresponding energy consuming device. The system also includes a processor coupled to the plurality of device drivers and adapted to cause each of the plurality of device drivers to periodically receive data from the respective one of the device controllers. The system further includes a display interface coupled to the processor and to a display. The display interface is adapted to transmit data to the display. A non-transitory computer readable medium having recorded thereon a program is provided. An apparatus for analyzing data from a plurality of energy consuming devices is provided.

21 Claims, 6 Drawing Sheets

(56) References Cited

U.S. PATENT DOCUMENTS

| | | | |
|---|---|---|---|
| 2013/0090770 A1* | 4/2013 | Lee et al. | 700/277 |
| 2013/0096727 A1* | 4/2013 | Brandt et al. | 700/291 |
| 2013/0178998 A1* | 7/2013 | Gadiraju et al. | 700/296 |
| 2013/0218349 A1* | 8/2013 | Coogan | G05B 13/02 700/275 |
| 2014/0039683 A1* | 2/2014 | Zimmermann et al. | 700/275 |

* cited by examiner

SYSTEM AND METHOD FOR REAL-TIME CONTROLS OF ENERGY CONSUMING DEVICES INCLUDING TIERED ARCHITECTURE

FIELD OF THE INVENTION

The present invention relates generally to management of energy consuming devices, and more specifically, to a database layer, display layer, and device layer architecture for managing energy consuming devices.

BACKGROUND

Many companies are forced to analyze and manage field device sensor data and energy consumption individually and at a high cost. The standard architecture for such systems causes extremely slow data display, with page switching times of thirty or more seconds, leading to a poor user experience.

Data display may be designed on a site level, as that is where the controls exist, and therefore multi-site data integration may be difficult. User interface (UI) customization tools are usually proprietary and specific to the system installed, resulting in the installing company doing all the UI development and customization for the end user.

Current energy management software systems are often proprietary to the manufacturer's platform. Therefore, once the initial vendor decision is made, users often face high switching costs and cannot easily shop for competitively priced platforms due to system incompatibility.

Extensive and in-depth analysis of energy management data may be time consuming and difficult. Energy analytics may be done by a team of engineers, and may take months from the data generation time to be returned to the user.

SUMMARY OF THE INVENTION

According to exemplary embodiments, the present invention provides an energy management technology and more particularly to systems and methods for multi-site device sensor data and energy consumption analytics.

A system for operating a plurality of energy consuming devices is provided that includes a plurality of device drivers coupled to respective device controllers. Each device controller is associated with a corresponding one of the energy consuming devices, and each device controller includes at least one sensor and is adapted to modulate an output setting of the corresponding energy consuming device. The system also includes a processor coupled to the plurality of device drivers and adapted to cause each of the plurality of device drivers to periodically receive data from the respective one of the device controllers. The system further includes a display interface coupled to the processor and to a display. The display interface is adapted to transmit data to the display.

The data received from the corresponding device driver from each of the device controllers includes a sensor reading of the sensor and/or the output setting.

The system may include a memory coupled to the processor. The memory may store the sensor reading of the sensor and/or the output setting for each of the device controllers.

Each device controller may store a control logic adapted to use the sensor reading as an input and adapted to modulate the output setting of the corresponding energy consuming device. The system may store a business logic adapted to modify the control logic of each device controller.

The business logic may include an alarm logic adapted to provide an alarm when at least one value exceeds a maximum and/or falls below a minimum. The value being the sensor reading, the output setting, a first average of the sensor reading, a second average of the output setting, a first calculated value based on at least one of the sensor reading and the output setting, and/or a second calculated value based on at least one of a plurality of sensor readings and a plurality of output settings.

The plurality of device drivers and the corresponding device controllers may be coupled over the internet, and the display interface and the display may be coupled over the internet.

Each of the device drivers may be adapted to communicate with one or more device controllers satisfying a corresponding category criteria. Each of the plurality of device controllers may be associated with at least one of the device drivers.

The device drivers may operate in an application layer of the system.

The display interface may be adapted to receive grouping information associating a subset of the energy consuming devices and the grouping information may be communicated to the processor. The processor may provide analytics based on the grouping information to the display interface for transmission to the display.

The system may include at least one multi-device driver coupled to at least one multi-device controller. Each multi-device controller may be coupled to a plurality of further device controllers, and each further device controller may be associated with one of the energy consuming devices.

Each of the energy consuming devices may be a light, a heater, a ventilation device, a pump, and/or an air-conditioning unit.

The display interface may be further adapted to receive control instructions directed to one or more of the device controllers to modulate the output setting of one or more of the energy consuming devices. Each of the device drivers may be further adapted to push the control instructions to a corresponding one or more of the device controllers to modulate the output setting of the corresponding one or more energy consuming devices.

A non-transitory computer readable medium having recorded thereon a program is provided. The program when executed causes a computer to perform a method for analyzing data from a plurality of energy consuming devices. The method includes periodically receiving data from a plurality of device controllers using a plurality of device drivers. Each device controller is associated with at least one of the energy consuming devices. The data is sensor data and/or output settings. Each of the device drivers is adapted to communicate with one or more of the devices satisfying a corresponding category criteria. Each of the plurality of energy consuming devices is associated with at least one of the device controllers. The method also includes storing the sensor data and the output settings for each of the energy consuming devices in a database. The method further includes processing the at least one of the sensor data and the output settings to allow comparisons of the sensor data and the output settings based on criteria selected by a user.

The method may include receiving control instructions directed to each of the energy consuming devices to modulate the output setting of one or more of the energy consuming devices. The method may include pushing the control instructions to a corresponding one or more of the energy consuming devices to modulate the output setting of the corresponding one or more of energy consuming devices.

The method may include modifying a control logic of each device controller based on a business logic. The method may include receiving grouping information associating a subset of the energy consuming devices, and providing analytics based on the grouping information to a display.

An apparatus for analyzing data from a plurality of energy consuming devices is provided that includes an arrangement for periodically receiving data from a plurality of device controllers using a plurality of device drivers. The apparatus includes an arrangement for storing the sensor data and the output settings for each of the energy consuming devices in a database. The apparatus includes an arrangement for processing the at least one of the sensor data and the output settings to allow comparisons of the sensor data and the output settings based on criteria selected by a user.

The apparatus may include an arrangement for receiving control instructions directed to one or more the energy consuming devices to modulate the output setting of one or more of the energy consuming devices. The apparatus may include an arrangement for pushing the control instructions to a corresponding one or more of the energy consuming devices to modulate the output setting of the corresponding one or more of energy consuming devices.

The apparatus may include an arrangement for modifying a control logic of each device controller based on a business logic.

The apparatus may include an arrangement for receiving grouping information associating a subset of the energy consuming devices, and an arrangement for providing analytics based on the grouping information to a display.

These and other advantages of the present invention will be apparent when reference is made to the accompanying drawings and the following description.

DETAILED DESCRIPTION OF EXEMPLARY EMBODIMENTS

Figure 1:
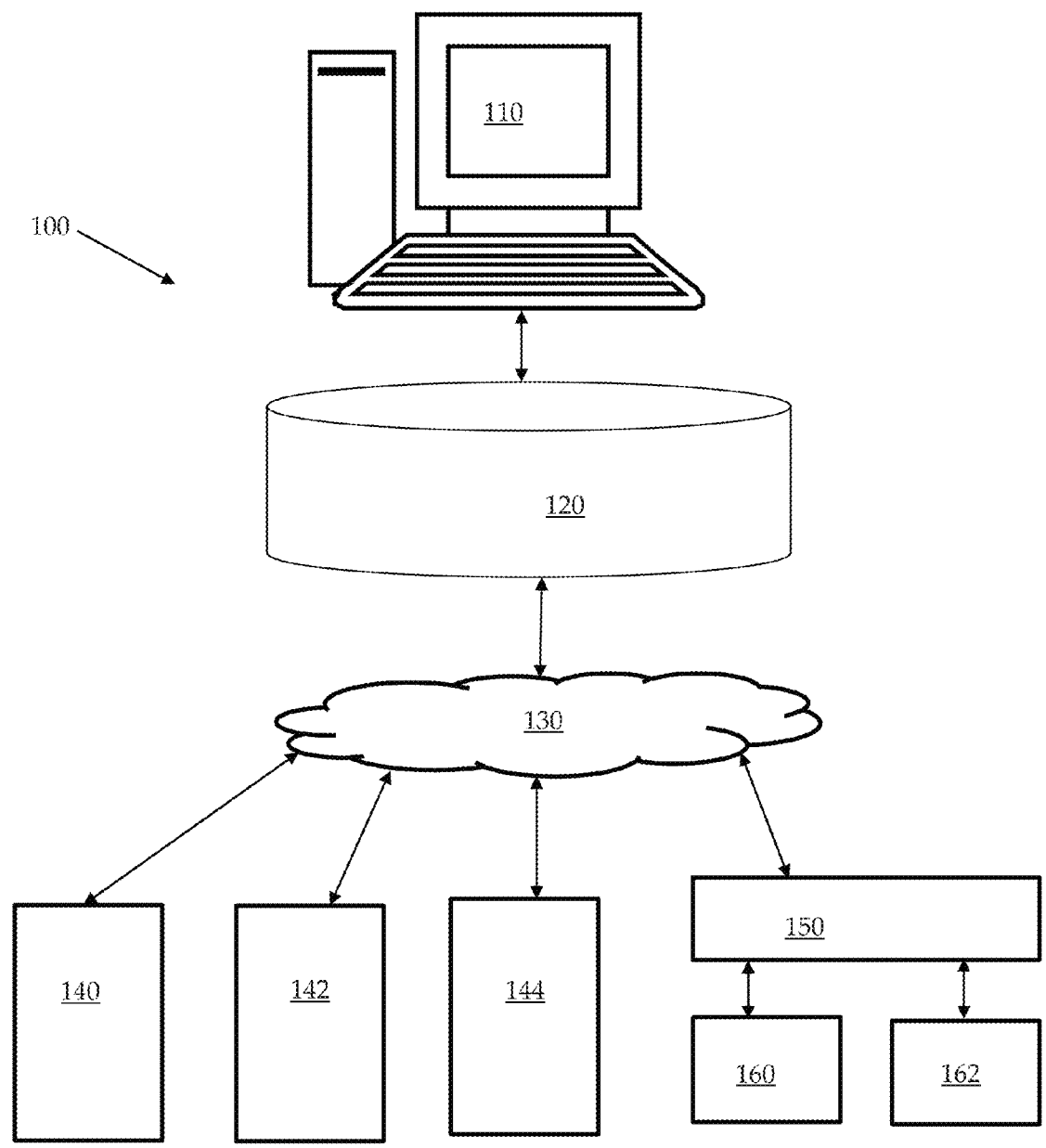
FIG. 1 is a diagram illustrating of a system according to an exemplary embodiment.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated. The present technology provides an efficient, comprehensive solution for monitoring and managing energy consumption in a multi-site segment. The present technology separates controls into three discreet layers: device, data, and display, and is designed to be platform agnostic in all three of these layers.

The present technology provides an improved user experience by displaying user requested data from the database layer, rather than from the field device layer. The average data page may load over ten times as fast as prior art system, which may result in page switching times of less than two seconds. This can be contrasted with more than thirty seconds for other energy management systems.

Easy multi-site integration is provided using the present technology. Because all the data is stored at the database level, there is no inherent need to manipulate this data from a site-centric perspective. This allows much more flexibility and speed in multi-site user displays. This enables a user to look at data in any manner they prefer, rather than simply the way it was gathered.

The present technology also allows for extensive user-interface (UI) customization. Because the UI adheres to web standards, all the modern web graphical user interface (GUI) tools can be applied to create the user experience. The palette of options is much broader with the open tools available to web development than with any proprietary GUI development system.

The present technology also reduces platform switching costs. The present technology is platform agnostic at the device level, and therefore the data and display layers can rest on many different device layers, simultaneously. For example, even with a Cisco mediator in one building and a Trend BCX in another building, the present system seamlessly gives the user the same experience with respect to both buildings. The user can select hardware platforms based on pricing and features, and freely move between options, without changing their user experience.

The present technology also lowers monitoring costs. The database layer allows for a whole new level of logic, separate from controls logic: business logic. Monitoring and analytics, independent from controls, are easily imbedded into the database structure. The turn-around time for analytics in the database may be a few seconds.

The present technology increases technician efficiency. By using currently available software, when dispatched to a site, technicians may be required to contact a central service staff in order to learn what the current energy consumption characteristics are of that particular location. This results in the retail customer paying for two employees—their own technician and the central service personnel. With the present technology, technicians can access instant, current, building-specific data populated via a mobile device or tablet computer, enabling the avoidance of significant wait times and in turn, the reduction of on-site hours.

The present technology provides a Geographic Information System (WebGIS) Mapping, and specifically segments stores or other locations and enabling analyzation of those within user-defined geographic areas. The importance of this functionality lies with the ability to track which stores are consuming above a specified average energy (measured in KwH/sq. ft.).

The present technology cross-references all sites within the user-defined geographic boundary and highlights buildings that are consuming above average levels of energy with respect to the average usage of the location. Managers can quickly, and in real time, observe and evaluate energy usage across all locations. Outliers can be identified quickly and remotely brought back to the average usage level. Alternatively, if necessary, technicians can be dispatched to the site. If monitored by centralized service personnel, multi-site management can create a significant recurring revenue stream with a high profit margin.

The present technology provides an open architecture and modular software. Each of the layers in the present technology is designed to be platform agnostic.

The present technology is designed from the ground up to be device agnostic. Any controls device that can communicate with another device using Modbus, bacnet, web interface, xml-rpc, or other API can be integrated with the present technology.

The present technology is built on the open standard MySQL database, and has been successfully run on all major server operating systems, including Linux, MacOSX, and Windows.

The present technology displays run with any major web browser, including Chrome, Safari, Firefox, and Internet Explorer. These displays can be on any web-enabled operating system, including PC's, Macs, Ipads, Iphones, Android tablets, Android phones, and netbooks.

The present technology will pull data and aggregate information from multiple hardware manufacturers, and will provide Enterprise level security and user management tools.

The present technology addresses software issues by having the ability to create any type of software application, with minimal development time and cost. The present technology uses the industry standard platforms of MySQL, PHP, and Apache, and includes an extensive, customized MySQL database and large library of PHP code that are not available for viewing or editing by the end user.

The database structure enables management of extremely large volumes of data generated by multi-site control systems. The analytic tools used to convert raw data into user-friendly layouts and formats are embedded in the PHP code library. The complex data extraction tools, or 'drivers', needed to access the different field devices are embedded in the PHP code library.

In contrast to the proprietary database structure, the data and metrics created by the present technology can be displayed by any of the major web display technologies, including Adobe Flash and the industry standard of HTML5/CSS3/Javascript/Ajax.

The present technology encompasses analytics software for additional appliances including HVAC, boiler and chillers, as well as other applications, including Demand Limiting, mobile device GUI with webGIS to pull data simply by physically being on-site and Demand Response.

A database layer according to the present technology collects and organizes data from many different types of devices. The devices compatible with the database may collect different data including sensor data, output data, and energy consumption, all possibly marked with a timestamp. The data from the different devices may have different data formats and data transmission frequencies. The database layer may include a set of driver modules adapted to communicate with different types of devices. The communication may include commands to change an energy output, increase a data collection frequency, and/or change a control logic.

Controls logic may typically reside in a device controller of an energy consuming device. Alternatively, controls logic may reside in a database, specifically a database computer local to the device. In this case, the server may synchronize with the device's local database computer, and the database layer may therefore be embedded into two or more devices. A multi-device database layer in which the database resides in or directly coupled to device controllers along with a centralized web server database may have a speed and/or data integrity comparable to the system described herein in which the database layer resides only in a centralized web server. Part of the database may thereby be local to a particular energy consuming device, with controls logic for that device residing in that part of the database.

FIG. 1 is a diagram illustrating system 100 according to an exemplary embodiment. System 100 includes display layer 110 in communication with database layer 120. Display layer 110 may be a personal computer, tablet computer, smartphone, or any other appropriate input/output device. Display layer 110 may communicate with database layer 120 over a telephone network, a mobile phone network, the internet, an extranet, an intranet, or any other appropriate network communication system.

Database layer 120 communicates with field device 140, field device 142, field device 144, and sub-system controller 150 through intermediate network 130. Intermediate network 130 may be a telephone network, a mobile phone network, the internet, an extranet, an intranet, or any other appropriate network communication system. Sub-system controller 150 includes field device 160 and field device 162.

Figure 2:
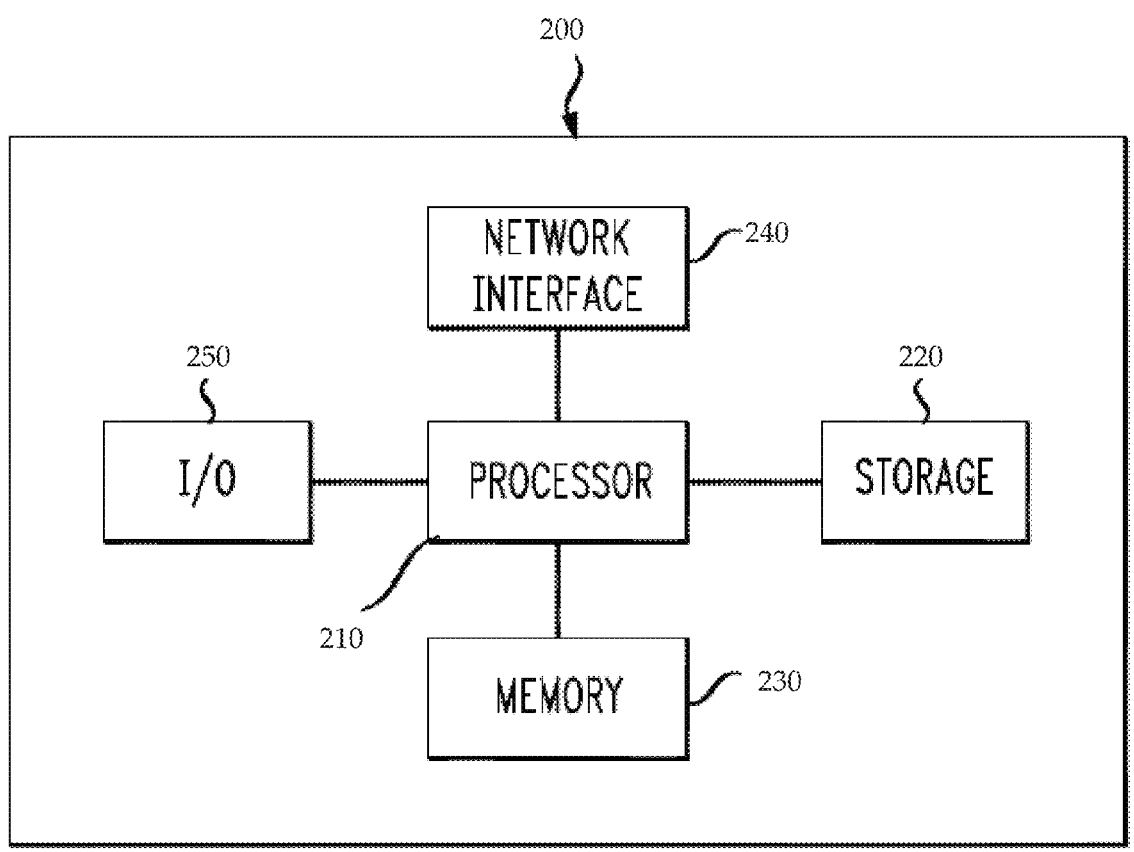
FIG. 2 illustrates a computer system according to an exemplary embodiment.

FIG. 2 illustrates a computer system according to an exemplary embodiment. Computer 200 may, for example, be display layer 110, database layer 120, or sub-system controller 150. Additionally, computer 200 can perform the steps described herein (e.g., with respect to FIG. 4). Computer 200 contains processor 210 which controls the operation of computer 200 by executing computer program instructions which define such operation, and which may be stored on a computer-readable recording medium. The computer program instructions may be stored in storage 220 (e.g., a magnetic disk, a database) and loaded into memory 230 when execution of the computer program instructions is desired. Thus, the computer operation will be defined by computer program instructions stored in memory 230 and/or storage 220 and computer 200 will be controlled by processor 210 executing the computer program instructions. Computer 200 also includes one or more network interfaces 240 for communicating with other devices, for example other computers, servers, or websites. Network interface 240 may, for example, be a local network, a wireless network, an intranet, or the Internet. Computer 200 also includes input/output 250, which represents devices which allow for user interaction with the computer 200 (e.g., display, keyboard, mouse, speakers, buttons, webcams, etc.). One skilled in the art will recognize that an implementation of an actual computer will contain other components as well, and that FIG. 2 is a high level representation of some of the components of such a computer for illustrative purposes.

Some of the above-described functions may be composed of instructions that are stored on storage media 220 (e.g., computer-readable medium). The instructions may be retrieved and executed by processor 210. Some examples of storage media are memory devices, tapes, disks, and the like. The instructions are operational when executed by processor 210 to direct processor 210 to operate in accord with the invention.

It is noteworthy that any hardware platform suitable for performing the processing described herein is suitable for use with the invention. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Database layer 120 may have a redundant web server configuration having one or more of the following features: 1) replicated databases, 2) scheduled backups to provide a second layer of protection in the case of a server crash, 3) redundant server with replication and IP Heartbeat provides for immediate failover and zero loss of data, 4) does not require constant monitoring or support, 5) no human intervention required for failure or recovery, and 6) proven open-source architecture with a long-term track record under sustained loads.

From a web server database, a replicated, redundant web server configuration may be developed using the following steps. First, by deploying a second, identical server and implementing MySQL Master-to-Master replication, a "Hot-Spare" server (also referred to herein as secondary production web server 306) is provided with data that is only milliseconds behind the primary web server.

The next step in the development is by deploying Heart-Beat IP, the two servers can share a common public IP address and all traffic is routed through that public IP. Therefore, when the primary web server fails, the secondary web server takes over the public IP address and handles all of the traffic. For example, if the primary web server fails, within 700 ms, failure is detected, and the public IP is moved and traffic is redirected to the secondary web server. When the primary web server comes back online (either due to reduced load or human intervention), replication resumes. Once replication has caught up and both databases are back in sync, the primary web server may regain control.

The next step in the development implements a content management framework that is database driven, thereby allowing the running code to take advantage of the features provided by MySQL replication and Heartbeat IP. In addition, the framework provides a publishing mechanism, which allows for easy transfer of code from development to production, including rollback and scheduled pushes. By creating a separate development environment, the production environment may remain uncorrupted.

The next step in the development provides a staging environment, which encourages the maintenance of an uncorrupted production environment. Finally, database backups are made at each level in the stack to provide a fourth layer of backup at the production level and a third layer of backup at the staging and development level. At any one time, there may be no less than eight copies of the content and code at various stages of production, excluding offline backups. Backups may be performed on the secondary web servers, reducing the load on the primary web server, which is extremely important for large data sets.

Figure 3:
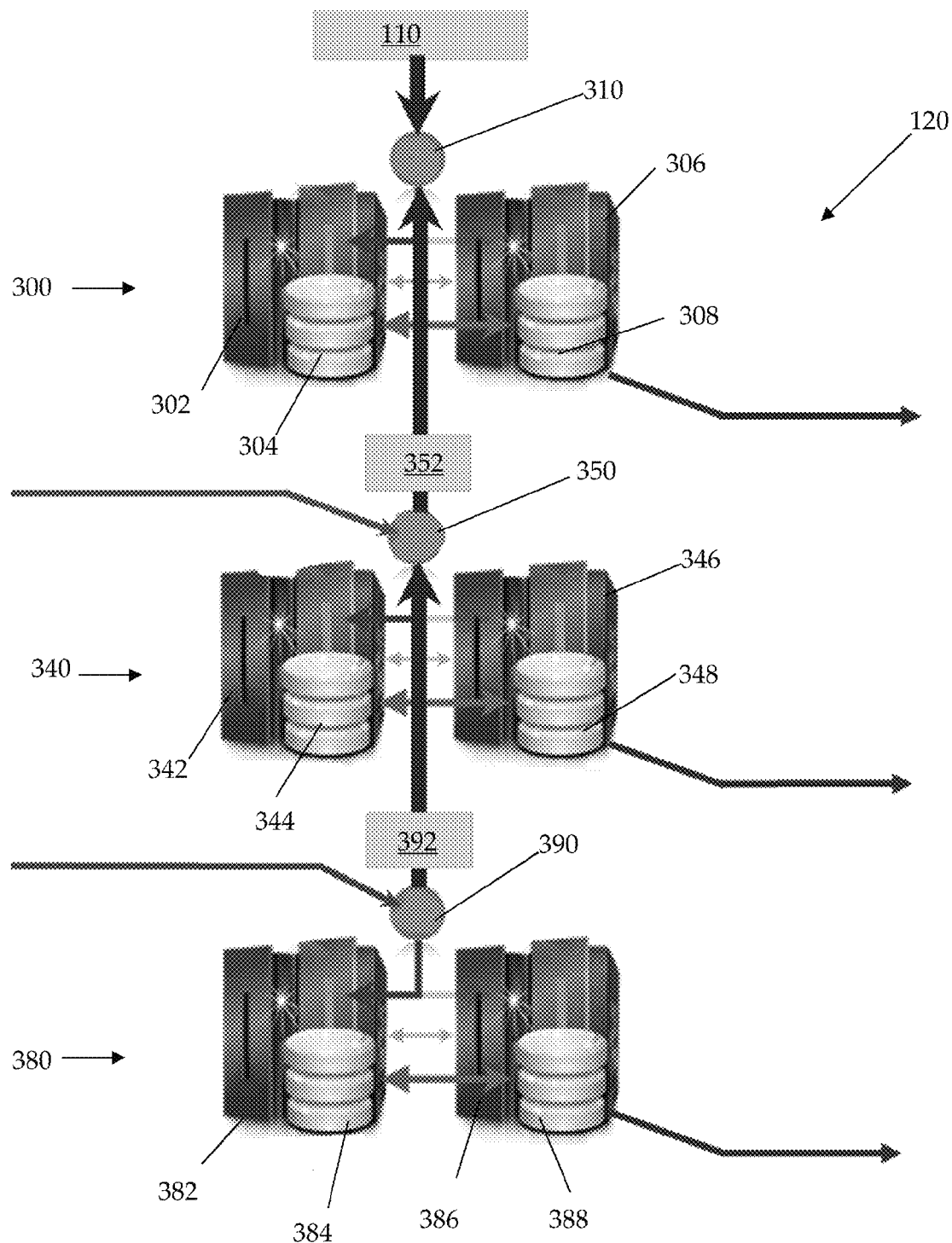
FIG. 3 is a diagram illustrating a database system according to an exemplary embodiment.

FIG. 3 is a diagram illustrating database layer 120 according to an exemplary embodiment. Database layer 120 includes production environment 300, staging environment 340, and development environment 380. Display layer 110 may communicate with production environment 300 of database layer 120 through production public IP address 310. Additionally or alternatively, a field device and/or a sub-system controller including one or more field devices may communicate with production environment 300 of database layer 120 through production public IP address 310.

Production environment 300 may include primary production web server 302, primary production database 304, secondary production web server 306, and secondary production database 308. Primary production web server 302 may bilaterally communicate with secondary production web server 306, and primary production database 304 may bilaterally communicate with secondary production database 308. Secondary production database 308 may communicate with a backup system which may be remotely located to prevent catastrophic loss of data due to failure of both primary production database 304 and secondary production database 308.

Customers may preview or review internally and/or test a new database system in staging environment 340 of database layer 120 through staging public IP address 350. Additionally or alternatively, a field device and/or a sub-system controller including one or more field devices may communicate with staging environment 340 of database layer 120 through staging public IP address 350.

Staging environment 340 may include primary staging web server 342, primary staging database 344, secondary staging web server 346, and secondary staging database 348. Primary staging web server 342 may bilaterally communicate with secondary staging web server 346, and primary staging database 344 may bilaterally communicate with secondary staging database 348. Secondary staging database 348 may communicate with a backup system which may be remotely located to prevent catastrophic loss of data due to failure of both primary staging database 344 and secondary staging database 348.

Developers may generate code, review and/or test a new database system in development environment 380 of database layer 120 through development public IP address 390. Additionally or alternatively, a field device and/or a sub-system controller including one or more field devices may communicate with development environment 380 of database layer 120 through development public IP address 390.

Development environment 380 may include primary development web server 382, primary development database 384, secondary development web server 386, and secondary development database 388. Primary development web server 382 may bilaterally communicate with secondary development web server 386, and primary development database 384 may bilaterally communicate with secondary development database 388. Secondary development database 388 may communicate with a backup system which may be remotely located to prevent catastrophic loss of data due to failure of both primary development database 384 and secondary development database 388.

Development of a new production environment 300 may start in development environment 380 and progress through staging transition 392 to staging environment 340. From staging environment 340, the development may progress through publishing transition 352 to production environment 300.

Figure 4:
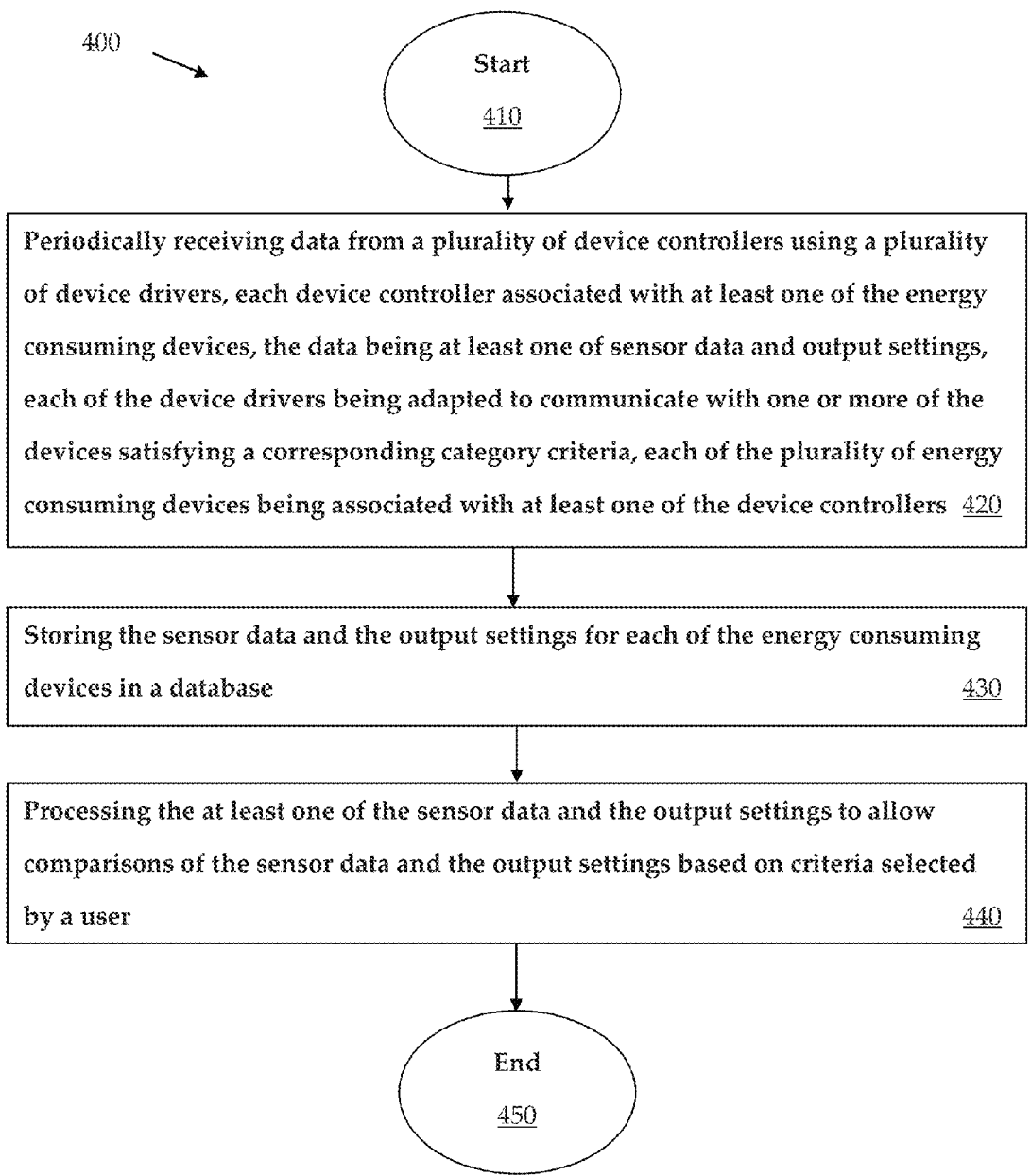
FIG. 4 is a flow chart illustrating an exemplary method.

FIG. 4 illustrates method 400 according to the present technology. Method 400 starts at start oval 410 and proceeds to operation 420, which indicates to periodically receive data from a plurality of device controllers using a plurality of device drivers. Operation 420 additionally indicates that each device controller is associated with at least one of the energy consuming devices, and that the data is sensor data and/or output settings. In operation 420, each of the device drivers is adapted to communicate with one or more of the devices satisfying a corresponding category criteria, and each of the plurality of energy consuming devices is associated with at least one of the device controllers. From operation 420, the flow proceeds to operation 430, which indicates to store the sensor data and the output settings for each of the energy consuming devices in a database. From operation 430, the flow proceeds to operation 440, which indicates to process the sensor data and/or the output settings to allow comparisons of the sensor data and the output settings based on criteria selected by a user. From operation 440, the flow proceeds to end oval 450.

Figure 5:
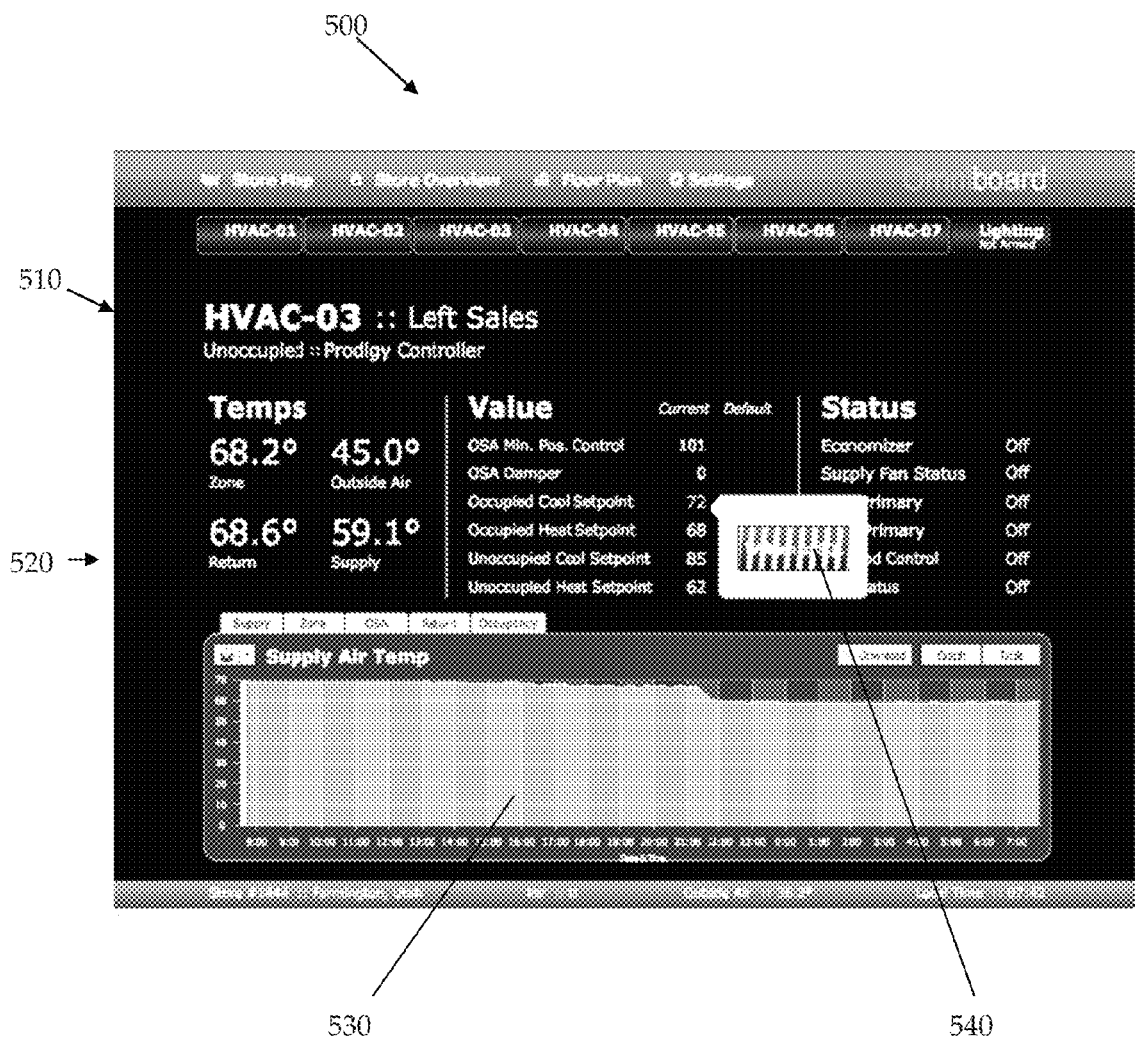
FIG. 5 is a screenshot of an exemplary graphical user interface according to an exemplary embodiment.

FIG. 5 is a screenshot of graphical user interface 500. Graphical user interface 500 is an exemplary, customizable interface enabling a user to monitor energy usage at energy consuming device 510. Sensor data 520 obtained from a controller associated with energy consuming device 510 is presented, along with historical values for the sensor data in the form of graph 530. Graphical user interface 500 includes callout 540 which has been superimposed on graphical user interface 500. Callout 540 indicates a data setpoint that may be adjusted by a user interacting with graphical user interface 500. The data setpoint adjustment may modify the business logic for controlling energy consuming device 510, and in particular may include an instruction written to the database in structured query language (SQL, a programming language designed for managing data in relational database management systems (RDBMS)).

Figure 6:
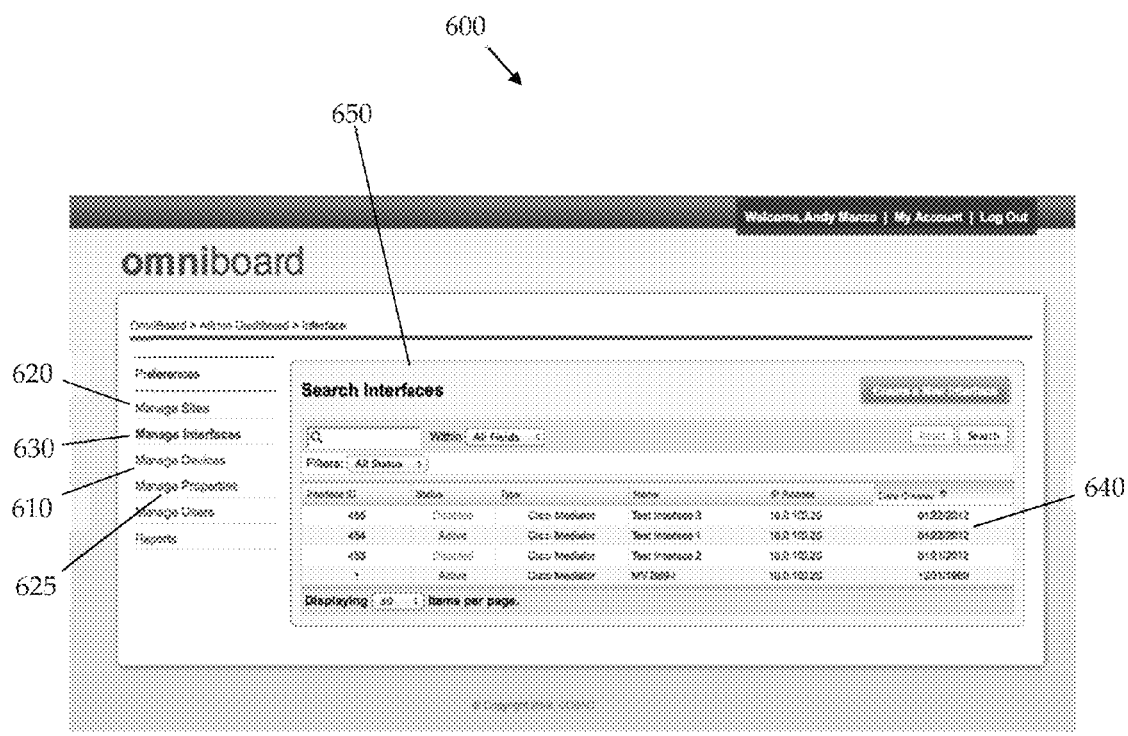
FIG. 6 is a screenshot of an exemplary graphical user interface according to an exemplary embodiment.

FIG. 6 is a screenshot of exemplary graphical user interface 600. Graphical user interface 600 includes a set of preferences on a navigation bar including manage sites 620, manage interfaces 630, manage devices 610, and manage properties 625. Manage properties 625 may be a collection of devices from manage devices 610. In FIG. 6, manage interfaces 630 is selected causing search interface 650 to be presented to the user. Within search interface 650, various controllers 640 for energy consuming devices are listed, including multi-site controllers, all of which may be controlled by a system according to the present technology. Controllers 640 in graphical user interface 600 are identified by an identifying number (interface ID), status, type, name, IP address, and date created. In this manner, a user may control at a simple and customizable GUI, via a database layer, any number of energy consuming devices.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system for operating a plurality of energy consuming devices, comprising:
   a plurality of device drivers coupled to respective device controllers, the device drivers allowing the coupled respective device controllers to communicate with an external processor on multiple hardware platforms,
   wherein each device controller is associated with a corresponding one of the energy consuming devices, and each device controller comprises at least one sensor and is adapted to modulate an output setting of the corresponding energy consuming device;
   a processor coupled to the plurality of device drivers and adapted to cause each of the plurality of device drivers to periodically extract raw data from the respective one of the device controllers associated with a corresponding one of the energy consuming devices being from multiple manufacturers,
   wherein the data is stored at a database level having a redundant web server configuration sharing a common public IP (Internet Protocol) address, the database level comprising one or more of a production environment, a staging environment, and a development environment;
   wherein the production environment comprises a common public IP address to provide communication between a primary production web server, a secondary production web server, a primary production database, and a secondary production database, the production environment configured to provide bilateral communication between the primary production web server and the secondary production web server and between the primary production database and the secondary production database;
   wherein the staging environment is communicatively coupled to a staging public IP address, the staging environment including a primary staging web server, a secondary staging web server, a primary staging database, and a secondary staging database, the staging environment configured to provide bilateral communication between the primary staging web server and the secondary staging web server and between the primary staging database and the secondary staging database;
   wherein the development environment is communicatively coupled to a development public IP address, and wherein the system is configured to provide a production environment development, the production environment development comprising a first phase instantiated in the development environment, a second phase for providing a staging transition to the staging environment from the first phase, and a third phase for providing a transition from the second phase to the production environment via a publishing transition; and
   a display interface coupled to the processor and to a display, the display interface adapted to transmit data to the display.

2. The system of claim 1, wherein the data extracted by each of the plurality of device drivers from the respective device controllers comprises at least one of:
   a sensor reading of the sensor; and
   the output setting.

3. The system of claim 2, further comprising a memory coupled to the processor, the memory storing at least one of the sensor reading of the sensor and the output setting for each of the device controllers.

4. The system of claim 2, wherein each device controller stores a control logic, the control logic adapted to use the sensor reading as an input and adapted to modulate the output setting of the corresponding energy consuming device.

5. The system of claim 4, wherein the system stores a business logic, the business logic adapted to modify the control logic of each device controller.

6. The system of claim 5, wherein the business logic includes an alarm logic, the alarm logic adapted to provide an alarm when at least one value one of exceeds a maximum and falls below a minimum, the at least one value being one of the sensor reading, the output setting, a first average of the sensor reading, a second average of the output setting, a first calculated value based on at least one of the sensor reading and the output setting, and a second calculated value based on at least one of a plurality of sensor readings and a plurality of output settings.

7. The system of claim 1, wherein:
the plurality of device drivers and the coupled respective corresponding device controllers are coupled over a network; and
the display interface and the display are coupled over the network.

8. The system of claim 1, wherein each of the device drivers is adapted to communicate with one or more device controllers satisfying a corresponding criteria, each of the one or more device controllers being associated with at least one of the device drivers.

9. The system of claim 1, wherein the device drivers operate in an application layer of the system.

10. The system of claim 1, wherein the display interface is adapted to receive grouping information associating a subset of the energy consuming devices, the grouping information being communicated to the processor, the processor providing analytics based on the grouping information to the display interface for transmission to the display.

11. The system of claim 1, further comprising at least one multi-device driver coupled to at least one multi-device controller, each multi-device controller coupled to a plurality of further device controllers, each further device controller associated with one of the energy consuming devices.

12. The system of claim 1, wherein each of the energy consuming devices is at least one of a light, a heater, a ventilation device, a pump, and an air-conditioning unit.

13. The system of claim 1, wherein:
the display interface is further adapted to receive control instructions directed to one or more of the device controllers to modulate the output setting of one or more of the energy consuming devices; and
each of the device drivers is further adapted to push the control instructions to a corresponding one or more of the device controllers to modulate the output setting of the corresponding one or more energy consuming devices.

14. A non-transitory computer readable medium having recorded thereon a program, the program when executed causing a computer to perform a method, the method for analyzing data from a plurality of energy consuming devices, the method comprising:
periodically receiving data from a plurality of device controllers, the received data being extracted by a plurality of device drivers, each device controller associated with at least one of the energy consuming devices, the received data being at least one of sensor data and an output setting of the energy consuming device, each of the device drivers being adapted to communicate with one or more of the energy consuming devices satisfying a corresponding category criteria, the energy consuming devices being from multiple manufacturers, each of the plurality of energy consuming devices being associated with at least one of the device controllers;
storing the sensor data and the output setting for each of the energy consuming devices at a database level having a redundant web server configuration sharing a common public IP (Internet Protocol) address, the database level comprising one or more of a production environment, a staging environment, and a development environment;
wherein the production environment comprises a common public IP address to provide communication between a primary production web server, a secondary production web server, a primary production database, and a secondary production database, the production environment configured to provide bilateral communication between the primary production web server and the secondary production web server and between the primary production database and the secondary production database;
wherein the staging environment is communicatively coupled to a staging public IP address, the staging environment including a primary staging web server, a secondary staging web server, a primary staging database, and a secondary staging database, the staging environment configured to provide bilateral communication between the primary staging web server and the secondary staging web server and between the primary staging database and the secondary staging database;
wherein the development environment is communicatively coupled to a development public IP address, and wherein the development of the production environment comprises a first phase instantiated in the development environment, a second phase for providing a staging transition to the staging environment from the first phase, and a third phase for providing a transition from the second phase to the production environment via a publishing transition; and
processing the at least one of the sensor data and the output settings to allow comparisons of the sensor data and the output settings based on criteria selected by a user.

15. The computer readable medium of claim 14, wherein the method further comprises:
receiving control instructions directed to each of the energy consuming devices to modulate the output setting of one or more of the energy consuming devices; and
pushing the control instructions to a corresponding one or more of the energy consuming devices to modulate the output setting of the corresponding one or more of energy consuming devices.

16. The computer readable medium of claim 14, wherein the method further comprises modifying a control logic of each device controller based on a business logic.

17. The computer readable medium of claim 14, wherein the method further comprises:
receiving grouping information associating a subset of the energy consuming devices; and
providing analytics based on the grouping information to a display.

18. A method for analyzing data from a plurality of energy consuming devices, comprising:
periodically receiving data from a plurality of device controllers, the received data being extracted by a plurality of device drivers, each device controller associated with at least one of the energy consuming devices, the data being at least one of sensor data and output settings, each of the device drivers being adapted to communicate with one or more of the energy consuming devices satisfying a corresponding category criteria, each of the plurality of energy consuming devices being associated with at least one of the device controllers and each of the energy consuming devices being from multiple manufacturers;
storing the sensor data and the output settings for each of the energy consuming devices at a database level having a redundant web server configuration sharing a common public IP (Internet Protocol) address, the database level comprising one or more of a production environment, a staging environment, and a development environment;
wherein the production environment comprises a common public IP address to provide communication between a primary production web server, a secondary production web server, a primary production database, and a secondary production database, the production environment configured to provide bilateral communication between the primary production web server and the secondary production web server and between the primary production database and the secondary production database;

wherein the staging environment is communicatively coupled to a staging public IP address, the staging environment including a primary staging web server, a secondary staging web server, a primary staging database, and a secondary staging database, the staging environment configured to provide bilateral communication between the primary staging web server and the secondary staging web server and between the primary staging database and the secondary staging database;

wherein the development environment is communicatively coupled to a development public IP address, and wherein the development of the production environment comprises a first phase instantiated in the development environment, a second phase for providing a staging transition to the staging environment from the first phase, and a third phase for providing a transition from the second phase to the production environment via a publishing transition; and processing the at least one of the sensor data and the output settings to allow comparisons of the sensor data and the output settings based on criteria selected by a user.

19. The method of claim 18, further comprising:
receiving control instructions directed to one or more the energy consuming devices to modulate the output setting of one or more of the energy consuming devices; and pushing the control instructions to a corresponding one or more of the energy consuming devices to modulate the output setting of the corresponding one or more of energy consuming devices.

20. The method of claim 18, further comprising modifying a control logic of each device controller based on a business logic.

21. The method of claim 18, further comprising:
receiving grouping information associating a subset of the energy consuming devices; and providing analytics based on the grouping information to a display.

* * * * *